(12) United States Patent
Huang et al.

(10) Patent No.: US 10,493,420 B2
(45) Date of Patent: Dec. 3, 2019

(54) COMPOSITE MATERIAL PREPARATION SYSTEM AND METHOD EFFECTIVELY IMPROVING COMPOSITE MATERIAL INTERFACE BONDING

(71) Applicant: SHAANXI UNIVERSITY OF SCIENCE & TECHNOLOGY, Shaanxi (CN)

(72) Inventors: Jianfeng Huang, Shaanxi (CN); Wenbin Li, Shaanxi (CN); Ruizi Li, Shaanxi (CN); Jiayin Li, Shaanxi (CN); Jie Fei, Shaanxi (CN); Haibo Ouyang, Shaanxi (CN); Liyun Cao, Shaanxi (CN); Duo Li, Shaanxi (CN); Lei Zhou, Shaanxi (CN)

(73) Assignee: SHAANXI UNIVERSITY OF SCIENCE & TECHNOLOGY, Shaanxi (CN)

( * ) Notice: Subject to any disclaimer, the term of this patent is extended or adjusted under 35 U.S.C. 154(b) by 231 days.

(21) Appl. No.: 15/739,370

(22) PCT Filed: Nov. 13, 2015

(86) PCT No.: PCT/CN2015/094507
§ 371 (c)(1),
(2) Date: Dec. 22, 2017

(87) PCT Pub. No.: WO2017/079955
PCT Pub. Date: May 18, 2017

(65) Prior Publication Data
US 2018/0185812 A1    Jul. 5, 2018

(30) Foreign Application Priority Data

Nov. 9, 2015  (CN) .......................... 2015 1 0755044

(51) Int. Cl.
*B01J 19/08* (2006.01)
*B01J 19/02* (2006.01)
(Continued)

(52) U.S. Cl.
CPC ......... *B01J 19/087* (2013.01); *B01J 19/0013* (2013.01); *B01J 19/0066* (2013.01);
(Continued)

(58) Field of Classification Search
CPC ...... B01J 19/087; B01J 19/1875; B01J 19/10; B01J 19/0066; B01J 19/0013; B01J 19/02;
(Continued)

(56) References Cited

U.S. PATENT DOCUMENTS 5,843,386 A * 12/1998 Makino ...................... B01J 3/04
422/203

FOREIGN PATENT DOCUMENTS

CN        1763258 A    4/2006
CN      102794148 A   11/2012
(Continued)

OTHER PUBLICATIONS

Machine Translation of CN 103044086 (Year: 2013).*
(Continued)

*Primary Examiner* — Daniel C. McCracken
(74) *Attorney, Agent, or Firm* — Alleman Hall Creasman & Tuttle LLP

(57) ABSTRACT

A composite material preparation system comprises a sealed reaction kettle for containing reactants and base materials; temperature and pressure detecting units for detecting the temperature and pressure inside the reaction kettle; and a heating unit for hydrothermally induced heating, based on the detected temperature and pressure values. The heating unit comprises an induction coil, an induction heating
(Continued)

device, and a control mechanism for controlling the generation of an induction frequency of the induction heating device. The reaction kettle is located in the induction coil, both ends of the induction coil are mounted on an outer wall of the induction heating device, and the induction coil and the induction heating device have circulating water introduced inside. The device can prepare a composite material having good interface bonding, by utilizing induced heating under the premise of controllable temperature and pressure, and by utilizing the characteristic that the reactants themselves are heated.

11 Claims, 2 Drawing Sheets

(51) Int. Cl.
*B01J 19/00* (2006.01)
*B01J 19/10* (2006.01)
*B01J 19/18* (2006.01)

(52) U.S. Cl.
CPC ............... *B01J 19/02* (2013.01); *B01J 19/10* (2013.01); *B01J 19/1875* (2013.01); *B01J 2219/00139* (2013.01); *B01J 2219/00162* (2013.01); *B01J 2219/0854* (2013.01); *B01J 2219/0871* (2013.01); *B01J 2219/0877* (2013.01); *B01J 2219/0888* (2013.01)

(58) Field of Classification Search
CPC ........ B01J 2219/0888; B01J 2219/0877; B01J 2219/0871; B01J 2219/0854; B01J 2219/00162; B01J 2219/00139; B01J 19/18; B01J 2219/0295; B01J 2219/0009; B01J 2219/0803; B01J 19/0053; B01J 19/0006

See application file for complete search history.

(56) References Cited

FOREIGN PATENT DOCUMENTS

| CN | 103044086 | * | 4/2013 | ............. C04B 41/89 |
|---|---|---|---|---|
| CN | 103044086 A | | 4/2013 | |
| CN | 203090915 | * | 7/2013 | ............. B01J 19/18 |
| CN | 203090915 U | | 7/2013 | |
| CN | 104130022 A | | 11/2014 | |
| CN | 204134630 U | | 2/2015 | |
| CN | 104701517 A | | 6/2015 | |
| CN | 104945001 A | | 9/2015 | |
| WO | 2009098452 A2 | | 8/2009 | |
| WO | 2013128366 A2 | | 9/2013 | |

OTHER PUBLICATIONS

Machine Translation of CN 203090915 (Year: 2013).*
Zhou, X. "Composite Material," Chemical Industry Press, Beijing, Jan. 1, 2005, 13 pages. (See Background of Specification of Application for Explanation of Relevance).
Su, F. et al., "Tribological and mechanical properties of the composites made of carbon fabrics modified with various methods," Composites Part A: Applied Science and Manufacturing, vol. 36, Issue 12, Apr. 22, 2005, 7 pages.
Chen, Z. et al., "Progress in the Preparation of Nanomaterials Employing Template Method," Chemical Industry and Engineering Progress, No. 1, Jan. 2010, 7 pages.
ISA State Intellectual Property Office of the People's Republic of China, International Search Report issued in PCT Application No. PCT/CN2015/094507, dated Aug. 22, 2016, WIPO, 5 pages. (Submitted with English Translation of Search Report).

* cited by examiner

COMPOSITE MATERIAL PREPARATION SYSTEM AND METHOD EFFECTIVELY IMPROVING COMPOSITE MATERIAL INTERFACE BONDING

FIELD OF THE INVENTION

The present application belongs to the field of material synthetic technology, and relates to a composite material preparation system and method capable of effectively improving the interface bonding of a composite material.

BACKGROUND OF THE INVENTION

With the rapid development of cutting-edge science and technology, the requirements for material performance are increasing. In many fields, the performance of traditional single-phase materials cannot meet actual needs, which has prompted people to study and prepare composite materials consisting of multiple phases to improve the performance thereof [Xiya ZHOU, "COMPOSITE MATERIAL," Chemical Industry Press, Beijing].

However, to realize a "1+1>2" synergistic effect of a composite material, the interface thereof is crucial. In order to obtain excellent interface bonding, some methods have been widely used, such as, surface treatment of the reinforcement (such as chemical corrosion, ray irradiation, and addition of silane coupling agent, etc.), adding specific elements to the matrix, and coating on the surface of the reinforcement [Su F, Zhang Z, Wang K, Jiang W, Liu W. "Tribological and mechanical properties of the composites made of carbon fabrics modified with various methods." Composites Part A: Applied Science and Manufacturing. 2005; 36(12):1601-7.].

There are physical methods and chemical methods for preparation of nanocomposites. Physical methods mainly include the mechanical grinding composite method, dry impact method, high energy ball milling method, blending method, heterogeneous condensation method, high temperature evaporation method, etc. The nanocomposites prepared by these methods have some advantages, such a, clean surfaces, no impurities, particle controllability, and high activity, but currently the yield is relatively low and the cost is high. Chemical methods mainly include the sol-gel method, hydrothermal method, microemulsion method, chemical vapor deposition method, solvent evaporation method, etc. Although these methods have a high yield, the prepared composite material contains certain impurities.

In most of the above methods, a third-party material is heated, and then transfers heat to reactants, thus achieving synthesis of a material at a certain temperature. When preparing a composite material by these methods, the matrix material and the reactants are simultaneously heated by the third-party material, the formation of the interface is completely random, without being guided, and the distribution of the reactants on the matrix material is not uniform and the interface bonding is poor. In order to achieve site-specific and controllable nucleation growth on the matrix and to form a better interface, it is necessary to treat the matrix material in advance (to make it charged or have some functional groups) to selectively provide it with active sites, so as to control the composite structure. It is apparent that this process is complex, and difficult to apply to industrial production.

Furthermore, when a template method is employed to synthesize a material with a certain structure, there are some requirements for the template, that is, the template itself should have an active site, or an active site can be introduced thereto through a certain treatment, so as to achieve a growth of the reactants in the matrix material. This makes some templates with a special structure unusable [CHEN Zhangxu, ZHENG Bingyun, L I Xianxue, F U Minglian, X I E Shuguang, DENG Chao, H U Yanhua, "Progress in The Preparation of Nanomaterials Employing Template Method" [J]. "Chemical Industry and Engineering Progress," 2010, (No. 1)].

SUMMARY OF THE INVENTION

In view of the above-mentioned issues in the prior art, the technical problem to be solved by the present application is to provide a composite material preparation system and a composite material preparation method, effectively improving the interface bonding of the composite material, in which a composite material with an excellent interface bonding is prepared, taking advantage of the characteristics of the reactants themselves being heated at a controllable temperature and pressure by induction heating.

In order to solve the above-mentioned technical problems, in one aspect, the present application provides a composite material preparation system comprising: a sealed reaction kettle for containing reactants and matrix materials; a temperature detecting unit for detecting the temperature in the reaction kettle; a pressure detecting unit for detecting the pressure in the reaction kettle; and a heating unit for hydrothermal induction heating of the reaction kettle, based on a temperature value detected by the temperature detecting unit and a pressure value detected by the pressure detecting unit; wherein the heating unit comprises an induction coil, an induction heating device, and a control mechanism for controlling the induction frequency of the induction heating device, and wherein the reaction kettle is located in the induction coil, both ends of the induction coil are mounted on an outer wall of the induction heating device, and circulating water is circulated inside the induction coil and the induction heating device.

According to the composite material preparation system of the present application, prior to a reaction, the circulating water flows through an internal pipe of the induction heating device into the induction coil, flows out from the induction coil and then into the internal pipe of the induction heating device, and eventually flows out. Reactants and matrix materials are then added to the reaction kettle and the reaction kettle is sealed, and the temperature detecting unit and the pressure detecting unit are employed to detect the temperature and pressure in the reaction kettle. Finally, the reaction kettle is fixed in the induction coil, the temperature detecting unit and the pressure detecting unit are in operation, the induction heating device is turned on, and the reaction kettle is hydrothermally induction heated, with the induction frequency and output current of the induction heating device being controlled. After the reaction, the induction heating device, the temperature detecting unit, and the pressure detecting unit are turned off, the circulating water is stopped until the reaction kettle is cooled to room temperature, the reaction kettle is taken out, and the reaction product is retrieved.

According to the composite material preparation system of the present application, prior to a reaction, the circulating water is introduced into the induction coil and the induction heating device before it goes out. A mixture as a reactant is then transferred into the reaction kettle to which a matrix material capable of sensing an alternating magnetic field is added. The reaction kettle is sealed and placed in the heating unit of the present application for hydrothermal reaction, and then cooled to room temperature. The product is separated from the suspension, soaked and washed with deionized water and anhydrous ethanol, and dried to give a composite product containing the product. Thus, hydrothermal induction technology can be used to synthesize a composite material or a special structural material, the interface bonding of which can be effectively improved.

Furthermore, in the present application, the temperature of the reaction kettle may be controlled by controlling the ON or OFF of the current in the induction heating device, based on the temperature value detected by the temperature detecting unit.

According to the present application, the temperature value detected by the temperature detecting unit can be collected by the induction heating device and fed back to the induction heating device, so that the temperature can be adjusted and controlled automatically by turning on or off the current in the induction heating device.

The present application is not limited thereto. The temperature in the reaction kettle may be manually controlled by observing the temperature value detected by the temperature detecting unit and manually controlling the ON or OFF of the current in the induction heating device.

Furthermore, in the present application, the temperature detecting unit may include an optical fiber temperature sensor or an infrared thermometer connected to the reaction kettle.

According to the present application, an optical fiber temperature sensor or an infrared thermometer, which is used as a temperature detecting unit, is intrinsically safe, free of electromagnetic interference, can be remotely monitored, has a high accuracy and a high sensitivity, is resistant to high pressure and corrosion, can work in harsh environments, and has a low cost. Thus, the anti-electromagnetic interference ability of the temperature measurement system can be significantly improved, the temperature measurement accuracy can be increased, and the cost can be reduced.

Furthermore, in the present application, the pressure detecting unit may include a pressure sensor and a pressure digital display system connected to the reaction kettle.

According to the present application, the pressure detecting unit mainly performs the measurement of the pressure by means of a pressure sensor capable of sensing the gas pressure in the reaction kettle, and converts an electrical signal into a digital signal by, for example, a minitype high pressure reaction kettle program control system and then displays it. In addition, a relief valve may be provided to relieve the pressure after the reaction.

According to the present application, the pressure value detected by the pressure detecting unit can be collected by the induction heating device and fed back to the induction heating device, so that the pressure can be adjusted and controlled automatically by turning on or off the current in the induction heating device.

The present application is not limited thereto. The pressure in the reaction kettle may be manually controlled by observing the pressure value detected by the pressure detecting unit and manually controlling the ON or OFF of the current in the induction heating device.

According to the present application, an ON/OFF controllable switch can be provided at the location of the relief valve, and the ON or OFF of the switch can be controlled by a pressure feedback value detected by the pressure detecting system, thereby achieving precise control of the pressure.

Furthermore, in the present application, a gas pressure sensor with a probe made of non-metal, non-carbon (mainly polymer) material may be used as a sensor of the pressure detecting unit.

Furthermore, in the present application, a stirring device for stirring the substance in the reaction kettle may be further included, the stirring device comprising: a transmission rod provided in the body of the reaction kettle; a stirring blade mounted on the transmission rod; and a driving device provided outside of the kettle body for driving the transmission rod to rotate.

According to the present application, it is possible to ensure the uniformity and dispersibility of the reactants by using the above-described stirring device.

Furthermore, in the present application, the stirring blade comprises one or more of an axial flow stirring blade, a radial flow stirring blade, or a mixed flow stirring blade, and preferably the gap between the stirring blade and the inner wall of the kettle body is 0.5 to 1 cm.

According to the present application, the above-mentioned gap parameter is more advantageous for uniformly stirring, so that the reactants in the reaction kettle are uniformly mixed without agglomeration and precipitation.

Furthermore, in the present application, the reaction kettle may be placed in an ultrasonic unit for stirring.

According to the present application, the reaction kettle can also be placed in, for example, an ultrasonic apparatus, and the dispersion of the reactants can be achieved by controlling the ultrasonic power, so that the product can be uniformly grown and distributed on the matrix material.

Furthermore, in the present application, the induction coil may be formed by a square copper tube, have a circular shape, be wound with an insulating layer on the outer layer, and have a turn number of 2 to 10, a length of 0.5 to 2 m, and an inner diameter of 20 to 200 mm.

According to the application, a square copper tube, which is used as an induction coil, has the advantages such as low resistance, low power consumption, convenient welding, and high strength, etc. A circular induction coil is more conducive to the generation of alternating magnetic fields and the cutting of magnetic induction lines by an inducible body, which contributes to the generation of induction currents and the heating of an inducible body. When the frequency is too low, the device will enter automatic protection, experience vibration issues, or automatically shut down; when the frequency is high, the device will automatically reduce the heating power; and when the frequency is too high, the power components in the device will be burned instantly. Different number of turns, length and inner diameter of the coil will cause different induction frequency and output power. When the number of turns of the coil is too small, and the inner diameter of the coil is too small, the frequency may be excessively high which will result in equipment failure. A coil that is too long is not conducive to the fixation of the reaction kettle. Therefore, the induction frequency and the power range of a certain induction heating device are definite, thus the number of turns, length and inner diameter of the coil are required to match well, instead of being arbitrarily set. In summary, the safe operation of the induction heating device is the prerequisite for these parameters of the application, and these parameters are more conducive to the generation of an alternating magnetic field, more conducive to a better cooling effect, and more conducive to a better heating effect.

Furthermore, in the present application, the materials of the reaction kettle may include high molecular polymers.

According to the present application, the reaction kettle can be made of high molecular polymer such as para-polyphenol (PPL) or polytetrafluoroethylene (PTFE), thereby improving the properties of the reaction kettle, such as resistance to electromagnetic interference, high temperature resistance, thermal stability, corrosion resistance, radioresistance, chemical resistance, and solvent resistance.

According to the present application, the entire sealing system is made of a non-metal, non-carbon (mainly polymer) material, which may avoid the influence of the alternating magnetic field on a metal sealing system. In addition, the entire reaction kettle, including a kettle cover, a kettle body, and a sealing system, is made of a polymer material, so the whole system is very light and easy to fix and carry. The fixation of the reaction kettle in the induction coil can be achieved by providing a groove in the bottom of the reaction kettle, by forming the reaction kettle into a stepped column with the diameter of the upper portion being larger than the inner diameter of the induction coil, or by constructing a holder for the reaction kettle.

According to the present application, in view of safety and the like, the relief valve may be made of metal. In order to prevent the relief valve from being affected by the alternating magnetic field, the distance of the relief valve from the induction coil may be greater than 50 cm.

Furthermore, in the present application, the reaction kettle may be sealed by a sealing mechanism including a flange plate provided at the open end of the body of the reaction kettle, a flange cover provided on the kettle cover of the reaction kettle, and a fastening means for tightly connecting the flange plate and the flange cover.

According to the present application, by means of the above-described sealing mechanism, the sealing of the reaction kettle can be effectively achieved, and it is easy to open the reaction kettle to retrieve the reaction product after the reaction.

In another aspect, the present application provides a method of preparing a composite material using the above-described composite material preparation system, comprising the steps of: circulating the circulating water inside the induction coil and the induction heating device of the heating unit; containing the reactants and the matrix materials in the sealed reaction kettle; placing the reaction kettle in the induction coil; detecting the temperature in the reaction kettle; detecting the pressure in the reaction kettle; performing hydrothermal induction heating on the reaction kettle by controlling the induction heating device, based on a temperature value detected and a pressure value detected; and cooling the reaction kettle after the reaction to give a reaction product.

According to the present application, hydrothermal induction technology can be used to synthesize a composite material or a special structural material, the interface of which can be effectively improved.

Furthermore, in the present application, the induction heating device may output an induction frequency of 10 to 500 kHz and an induction current of 0 to 1200 A.

According to the present application, an induction heating device capable of outputting an induction frequency of 10 to 500 kHz can be selected depending on the size of the material to be heated. The value of the induction current in the induction device can be continuously adjustable in a range of 0 to 1200 A. The induction heating device may be connected with a control mechanism for controlling the induction frequency of the induction heating device, for example, a movable pedal that can control the induction frequency remotely, and thus the output of the induction frequency can be effectively controlled by the control mechanism.

The foregoing and other objects, features and advantages of the present application will be better understood from the following detailed description and with reference to the drawings.

REFERENCE NUMBERS

1—Optical fiber thermometer; 2—Optical fiber temperature sensor; 3—Minitype high pressure reaction kettle program control system; 4—Pressure sensor; 5—Relief valve; 6—Reaction kettle; 7—Induction coil; 8—Induction heating device; 9—Pedal; 10—Flange cover; 11—Kettle cover; 12—Flange plate; 13—Kettle body; 14—Thread; 15—Bolt; 16—Driving device (motor); 17—Transmission rod; 18—Stirring blade.

DETAILED DESCRIPTION OF THE EMBODIMENTS

The present application will be further described with the following embodiments below with reference to the drawings. It should be understood that the drawings and the following embodiments are only used for explaining this application, and do not limit this application.

Figure 1:
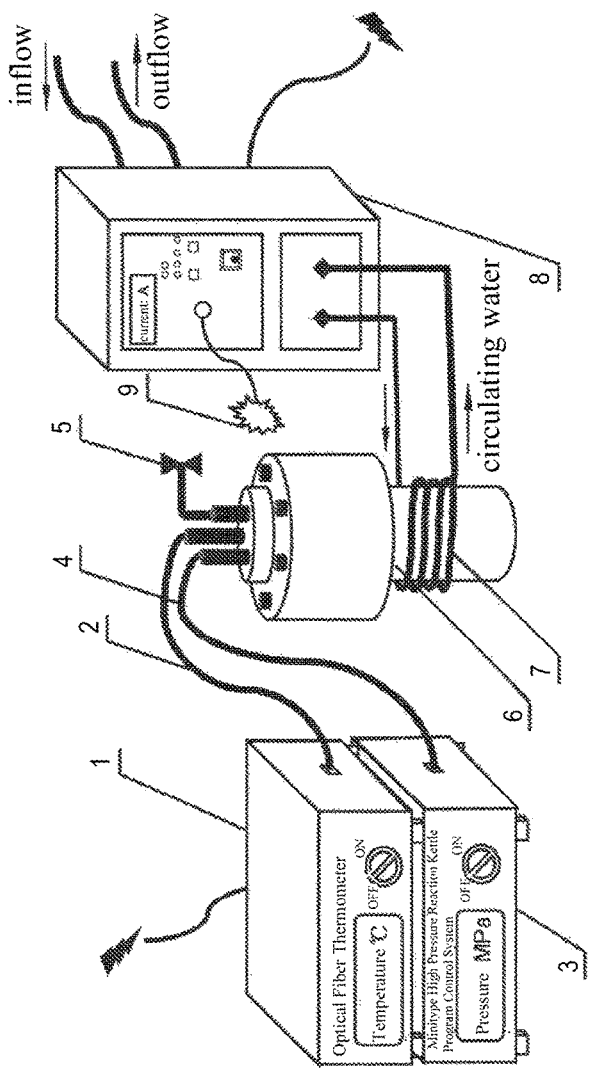
FIG. 1 is a schematic view of an overall structure of a composite material preparation system capable of effectively improving the interface bonding of a composite material, according to an embodiment of the present application.
Figure 2:
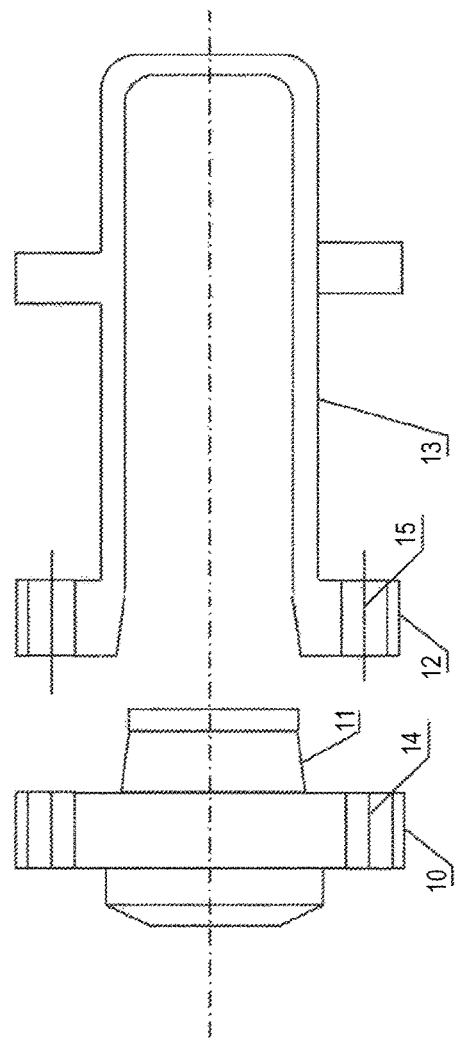
FIG. 2 is a schematic view of the structure of a reaction kettle in the composite material preparation system shown in FIG. 1.

Specifically, FIG. 1 is a schematic view of an overall structure of a composite material preparation system capable of effectively improving the interface bonding of a composite material, according to an embodiment of the present application; FIG. 2 is a schematic view of the structure of a reaction kettle in the composite material preparation system shown in FIG. 1; and FIG. 3 is a schematic view of the structure of a stirring device in the composite material preparation system shown in FIG. 1.

Figure 3:
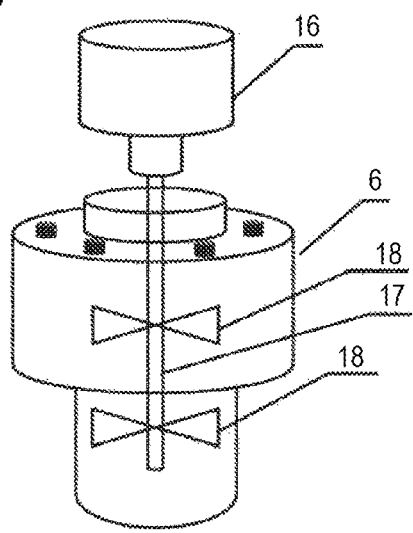
FIG. 3 is a schematic view of the structure of a stirring device in the composite material preparation system shown in FIG. 1.

In light of various defects in the preparation of composite materials in the prior art, the present application provides a composite material preparation system as shown in FIGS. 1 to 3, comprising: a sealed reaction kettle 6 for containing reactants and matrix materials; a temperature detecting unit for detecting the temperature in the reaction kettle 6; a pressure detecting unit for detecting the pressure in the reaction kettle 6; and a heating unit for hydrothermal induction heating of the reaction kettle based on the temperature value detected by the temperature detecting unit and the pressure value detected by the pressure detecting unit; the heating unit comprises an induction coil 7, an induction heating device 8, and a control mechanism 9 for controlling the induction frequency of the induction heating device 8, the reaction kettle 6 is located in the induction coil 7, both ends of the induction coil 7 are mounted on an outer wall of the induction heating device 8, and circulating water is circulated inside the induction coil 7 and the induction heating device 8.

The composite material preparation system of the application can be used for carrying out a hydrothermal induction preparation method which can effectively improve interface bonding of a composite material. The method is simple and easy to control, can synthesize various special structures which are difficult to synthesize by conventional methods, and can effectively improve interface bonding of a composite material.

For example, firstly, a substance $A_s$ is dissolved in a solvent $A_l$ while stirring to obtain a solution A, and a substance $B_s$ is dissolved in a solvent $B_l$ while stirring to obtain a solution B. Then, the solution A and the solution B are mixed and stirred uniformly with the pH being adjusted to obtain a solution C. Finally, the solution C, as a reactant, is transferred to the reaction kettle 6, to which a matrix material D capable of sensing an alternating magnetic field is added. The reaction kettle 6 is sealed and placed in the induction coil 7. The reaction kettle 6 is heated by a current output from the induction heating device 8. After the reaction, the product is separated from the resulting suspension, washed, and dried to give a composite product F containing a product E (E is a product synthesized from As and Bs).

Specifically, the composite material preparation system of the application can be used for carrying out the following preparation method:

Step 1: The substance $A_s$ is dissolved in the solvent $A_l$, using magnetic stirring for 30 to 120 minutes (or ultrasonic vibration for 30 to 120 minutes) to obtain the solution A with a concentration of 0.01 to 5 mol/L;

Step 2: The substance $B_s$ is dissolved in the solvent $B_l$, using magnetic stirring for 30 to 120 minutes (or ultrasonic vibration for 30 to 120 minutes) to obtain the solution B with a concentration of 0.01 to 5 mol/L;

Step 3: The solution A and the solution B are mixed and magnetically stirred for 30 to 300 minutes with the pH being adjusted to obtain the solution C;

Step 4: The solution C is transferred to a reaction kettle, to which the matrix material D capable of sensing an alternating magnetic field is added. The reaction kettle is sealed and placed in the induction heating device for a reaction for 10 minutes to 24 hours under an induction frequency of 10 to 500 kHz and an output current of 0 to 1200 A, and naturally cooled to room temperature;

Step 5: The product is separated from the suspension after the reaction, immersed and washed with deionized water and anhydrous ethanol, respectively, and dried to obtain the composite product F containing the product E.

In the present application, the induction coil 7 is arranged on the outer wall of the kettle body of the reaction kettle 6, and the matrix material D in the kettle is precisely located in the middle of the induction coil 7, and thus the heating is uniform with high efficiency, and a local overheating phenomenon can be avoided; the induction heating device 8 outputs an alternating current to the induction coil, by which an alternating magnetic field is produced, and the materials in the kettle cut the magnetic induction line, resulting in an induction current, so that the material in the kettle capable of sensing an alternating magnetic field is heated per se; and the output power can be adjusted by controlling the output current, and thus the reaction temperature can be controlled. Meanwhile, the matrix material D with a high temperature can facilitate the material E to nucleate in its surrounding, and the growth rate of the crystal can be regulated by adjusting the stirring rate or ultrasonic power, and thus the particle size of the product can be regulated and controlled.

In addition, as shown in FIG. 1, the kettle body of the reaction kettle 6 is located inside the induction coil 7 which is mounted on the outer wall of the induction heating device 8, circulating water from a circulating water system is circulated inside the induction coil 7 and the induction heating device 8, and the reaction kettle 6 is equipped with a temperature and pressure detecting system and is connected to a program control system which can show the temperature and pressure in the kettle.

In addition, for the hydrothermal induction heating technology, it's common that the temperature in the kettle rises as the output power increases and the reaction duration prolongs, and therefore a control system must be introduced for keeping the temperature constant. In the present application, the temperature control can be realized in two ways: one is manual, that is, a pedal 9 is used to realize the turn-on and turn-off of the induction heating based on the observed temperature change from the temperature detecting unit; another is an automatic adjustment system, that is, the temperature value of the temperature detecting unit is collected and fed back to the induction heating device, and thus an automatic adjustment and control of the temperature can be realized by the induction heating device.

Furthermore, conventional thermocouple sensors mostly employ a metal probe. However, the metal probe will be heated in an alternating magnetic field, and thus could not be used in a hydrothermal induction heating device. Considering the anti-electromagnetic interference performance, the temperature measurement accuracy and the cost of the probe, an optical fiber temperature sensor 2 or an infrared thermometer connected to the reaction kettle 6 may be adopted as the temperature detecting unit in the present embodiment.

Further, in order to ensure good uniformity and dispersibility of the reactants, a stirring device may be introduced into the reaction kettle 6, the stirring device including a transmission rod 17 provided inside the kettle body, a stirring blade 18 provided on the transmission rod, and a driving device 16 provided outside the kettle body for driving the transmission rod 17. The stirring blade 18 employs one or more of an axial flow stirring blade, a radial flow stirring blade or a mixed flow stirring blade, and the gap between the stirring blade 18 and the inner wall of the kettle body is 0.5 to 1 cm; alternatively, the reaction kettle can be placed in an ultrasonic apparatus, and the dispersion of the reactants can be achieved by controlling the ultrasonic power, thus realizing a uniform growth and distribution of the product E in the matrix material D.

Further, in the present embodiment, the pressure detecting unit is mainly embodied as a pressure sensor 4 capable of sensing the gas pressure in the reaction kettle, and a mini-type high pressure reaction kettle program control system 3 converts an electric signal into a digital signal and then displays it. In addition, a relief valve 5 connected to the reaction kettle 6 shown in FIG. 1 can relieve the pressure after the reaction.

In addition, since most metals can sense an alternating magnetic field, the choice of material for the reaction kettle 6 is a key issue. Considering the resistance to electromagnetic interference, high temperature resistance, thermal stability, corrosion resistance, radioresistance, chemical resistance, and solvent resistance, a high molecular polymer such as para-polyphenol (PPL) or polytetrafluoroethylene (PTFE) can be employed as the material of the reaction kettle 6.

Considering the sealing safety of the reaction kettle and the sealing materials as selected (resistance to electromagnetic interference, high temperature resistance, thermal stability, corrosion resistance, radioresistance, chemical resistance, and solvent resistance), a flange cover 10 with a thread 14 and a flange plate 12 can be employed for sealing. The flange plate 12 may be provided at the open end of the kettle body 13 of the reaction kettle 6, and the flange cover 10 may be provided on a kettle cover 11 of the reaction kettle 6. The flange plate 12 and the flange cover 10 can be tightly connected to each other by bolts 15 inserted into the threads 14. Thus, the upper seal of the reaction kettle body is embodied by a thread sealing. In addition, a buckle and the like may be further provided to increase the safety of the device.

Preferably, in the above-mentioned preparation method carried out by the preparation system of the present application, the product obtained in Step 5 may be subjected to a chemical etching or physical calcination treatment so as to remove the matrix material D, thus a material E with a controllable structure can be obtained. This provides a new technique for synthesis of materials by a template method.

The structure of the prepared composite material may be a thin film structure, a coating structure, a core-shell structure, a sheet-like interconnected particle structure, a porous structure, etc.

In addition, the mixed solution in the above-mentioned Step 3 may be in the form of a sol, thereby achieving a combination with the sol-gel method. Alternatively, the mixed solution may be paste-like, and coated on the matrix material D, thus achieving a material synthesis in air (or an atmosphere), rather than under liquid conditions. In the Step 3, the pH is adjusted by using 0.1 to 5 mol·L$^{-1}$ hydrochloric acid solution, acetic acid solution, sodium hydroxide solution, potassium hydroxide solution, or aqueous ammonia. Preferably, the drying process in Step 3 is specifically carried out by placing the product in an electrothermal vacuum oven and heating it at 50 to 120° C. for 12 to 36 hours. In the Step 3, the pH ranges from 0 to 14.

Compared with the prior art, the application has the following advantages:

The present application provides a method for preparing a composite material having an excellent interfacial bonding by a hydrothermal induction technology. A solution A and a solution B are mixed, with the pH being adjusted, to obtain a solution C. Then, the solution C is transferred to a reaction kettle, to which a matrix material D capable of sensing an alternating magnetic field is added. After reaction in an induction heating device, the resulting suspension is retrieved, separated, washed, and dried, to give a composite product F containing a product E.

Composite materials with different properties can be synthesized by changing the output current and reaction duration, and composite materials with different structures can be obtained by selecting matrix materials D with different structures. In the hydrothermal induction heating technique, the heating of the matrix material D provides a site for the nucleation of the reactants and accelerates the growth of the crystals.

The matrix material itself in the application instead of a third party in the conventional process is heated, thus the principle of the preparation of composite materials is changed fundamentally (in the aspects of heating and heat transfer), the process is simple and easy to control, and the prepared composite material has a uniform chemical composition, a high purity, a crystal with a regular morphology and uniformly distributed small particles, and an excellent interface bonding. In addition, the preparation cycle of the composite material is greatly reduced, without the necessity of a subsequent treatment, and the preparation is environmentally friendly, thus easier to achieve industrial production.

The application has the following specific advantages:

(1) In a conventional hydrothermal or microwave hydrothermal synthesis technology, a third-party solvent is heated, and then the heated solvent transfers the heat to matrix materials and reactants, to synthesize a composite material, so there is no direct contact or reaction between D and E, resulting in a weak interface bonding between them. The application, using the hydrothermal induction heating technology, has completely changed the way of heating and heat transfer in the reaction. The matrix material itself is the first to be heated to a high temperature in a relatively short period of time, and the temperature of the rest is relatively low, thus, As and Bs react at the high temperature of the matrix material D to synthesize the product E, whereby the interface bonding between D and E can be significantly improved.

(2) Due to the high temperature of the matrix material in the induction heating, the material E is quickly synthesized and highly crystallized with a high purity, therefore no post-treatment is required.

(3) The technique can be applied to the preparation of materials with a certain structure by a template method, avoiding the shortcomings that the conventional template needs to be treated in advance to obtain an active site, which broadens the application field of the template method.

(4) The technique can be combined with a sol-gel method to achieve the preparation of composite materials in air (or an atmosphere).

(5) This method provides a new way for the preparation of coatings and films.

The present application will be described in further detail with reference to the drawings and examples.

Example 1

Step 1: 0.012 mol of potassium permanganate is dissolved in 30 ml of distilled water, with magnetic stirring for 30 minutes to obtain a 0.4 mol/L of potassium permanganate solution;

Step 2: 0.012 mol of phenylpropionaldehyde is dissolved in 30 ml of distilled water, with magnetic stirring for 30 minutes to obtain a 0.4 mol/L of phenylpropionaldehyde solution;

Step 3: the potassium permanganate solution and the phenylpropionaldehyde solution are mixed and magnetically stirred for 30 minutes to obtain a reaction precursor solution C;

Step 4: the precursor solution C is transferred to a reaction kettle, to which graphite sheets capable of sensing an alternating magnetic field is added. The reaction kettle is sealed and placed in a hydrothermal induction heating device for reaction for 24 hours under an induction frequency of 50 kHz and an output current of 200 A, then naturally cooled to room temperature;

Step 5: the compound product is separated from the suspension after the reaction, immersed and washed in deionized water and anhydrous ethanol, respectively, and dried to obtain a sheet-like $MnO_2$/graphite composite material.

Example 2

Step 1: 0.015 mol of potassium permanganate is dissolved in 30 ml of distilled water, with magnetic stirring for 50 minutes to obtain a 0.5 mol/L of potassium permanganate solution;

Step 2: 0.015 mol of phenylpropionaldehyde is dissolved in 30 ml of distilled water, with magnetic stirring for 50 minutes to obtain a 0.5 mol/L of phenylpropionaldehyde solution;

Step 3: the potassium permanganate solution and the phenylpropionaldehyde solution are mixed and magnetically stirred for 50 minutes to obtain a reaction precursor solution C;

Step 4: the precursor solution C is transferred to a reaction kettle, to which graphite sheets capable of sensing an alternating magnetic field is added. The reaction kettle is sealed and placed in a hydrothermal induction heating device for a reaction for 16 hours under an induction frequency of 50 kHz and an output current of 300 A, then naturally cooled to room temperature;

Step 5: the compound product is separated from the suspension after the reaction, immersed and washed in deionized water and anhydrous ethanol, respectively, and dried to obtain a sheet-like $MnO_2$/graphite composite material.

Example 3

Step 1: 0.02 mol of potassium permanganate is dissolved in 30 ml of distilled water, with magnetic stirring for 70 minutes to obtain a 0.67 mol/L of potassium permanganate solution;

Step 2: 0.02 mol of phenylpropionaldehyde is dissolved in 30 ml of distilled water, with magnetic stirring for 70 minutes to obtain a 0.67 mol/L of phenylpropionaldehyde solution;

Step 3: the potassium permanganate solution and the phenylpropionaldehyde solution are mixed and magnetically stirred for 70 minutes to obtain a reaction precursor solution C;

Step 4: the precursor solution C is transferred to a reaction kettle, to which graphite sheets capable of sensing an alternating magnetic field is added. The reaction kettle is sealed and placed in an induction heating device for a reaction for 10 hours under an induction frequency of 50 kHz and an output current of 400 A, then naturally cooled to room temperature;

Step 5: the compound product is separated from the suspension after the reaction, immersed and washed in deionized water and anhydrous ethanol, respectively, and dried to obtain a sheet-like $MnO_2$/graphite composite material.

Example 4

Step 1: 0.03 mol of potassium permanganate is dissolved in 30 ml of distilled water, with magnetic stirring for 90 minutes to obtain a 1 mol/L of potassium permanganate solution;

Step 2: 0.03 mol of phenylpropionaldehyde is dissolved in 30 ml of distilled water, with magnetic stirring for 90 minutes to obtain a 1 mol/L of phenylpropionaldehyde solution;

Step 3: the potassium permanganate solution and the phenylpropionaldehyde solution are mixed and magnetically stirred for 90 minutes to obtain a reaction precursor solution C;

Step 4: the precursor solution C is transferred to a reaction kettle, to which graphite sheets capable of sensing an alternating magnetic field is added. The reaction kettle is sealed and placed in a hydrothermal induction device for a reaction for 1 hour under an induction frequency of 50 kHz and an output current of 500 A, then naturally cooled to room temperature;

Step 5: the compound product is separated from the suspension after the reaction, immersed and washed in deionized water and anhydrous ethanol, respectively, and dried to obtain a sheet-like $MnO_2$/graphite composite material.

Figure 4:
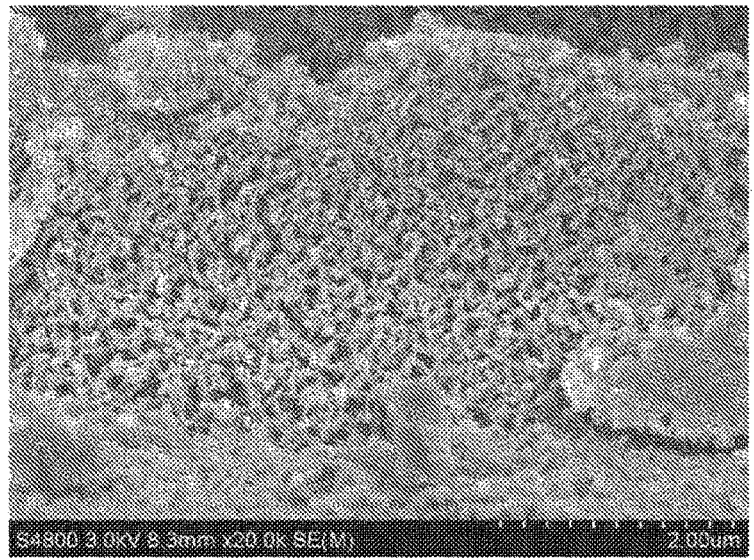
FIG. 4 is a scanning electron microscopy (SEM) photograph of the $MnO_2$/graphite composite prepared in Example 4 of the present application.

FIG. 4 is a scanning electron microscopy (SEM) photograph of the $MnO_2$/graphite composite prepared in Example 1. It can be seen from FIG. 4 that $MnO_2$ with a small particle size is supported on a graphite sheet and forms a dense layer, and the particles are interconnected, forming a regular pore structure.

The application integrates the advantages of induction heating and hydrothermal reaction technology, and applies hydrothermal induction heating technology to the preparation of composite materials, which can greatly improve the interface bonding of composite materials and overcome the shortcoming of the weak interface bonding when using third-party heating technology to synthesize composite materials. Meanwhile, a temperature and pressure testing during the reaction is achieved by a temperature detecting unit and a pressure detecting unit, thus achieving a controllable preparation of composite materials. In addition, a material E with a special structure can be obtained after removing the matrix material by chemical etching or physical calcination. Therefore, this technique provides a new method for the preparation of materials with a certain structure synthesized by a template method.

The invention can be embodied in many forms without departing from the essential characteristics of the application, and the embodiments of the application are intended to be illustrative and not restrictive. The scope of the invention is defined by the claims rather than the specification, and all changes which fall within the scope of the claims, or equivalents of the scope of the invention, are to be included in the claims.

The invention claimed is:

1. A method for preparing a composite material with a composite material preparation system, the composite material preparation system comprising:

a sealed reaction kettle for containing reactants and matrix materials;

a temperature detecting unit for detecting the temperature in the reaction kettle;

a pressure detecting unit for detecting the pressure in the reaction kettle; and a heating unit for hydrothermal induction heating of the reaction kettle, based on a temperature value detected by the temperature detecting unit and a pressure value detected by the pressure detecting unit;

wherein the heating unit comprises an induction coil, an induction heating device, and a control mechanism for controlling the induction frequency of the induction heating device, and wherein the reaction kettle is located in the induction coil, both ends of the induction coil are mounted on an outer wall of the induction heating device, and circulating water is circulated inside the induction coil and the induction heating device;

the method comprising the steps of:

circulating the circulating water inside the induction coil and the induction heating device of the heating unit;

containing the reactants and the matrix materials in the sealed reaction kettle;

placing the reaction kettle in the induction coil;

detecting the temperature in the reaction kettle;

detecting the pressure in the reaction kettle;

performing hydrothermal induction heating on the reaction kettle by controlling the induction heating device, based on the temperature value detected and the pressure value detected; and cooling the reaction kettle after the reaction to give a reaction product.

2. The method according to claim 1, characterized in that at least one of the temperature and pressure of the reaction kettle is controlled by controlling the ON or OFF of the current in the induction heating device, based on at least one of the temperature value detected by the temperature detecting unit and/or the pressure value detected by the pressure detecting unit.

3. The method according to claim 1, characterized in that the temperature detecting unit includes an optical fiber temperature sensor or an infrared thermometer connected to the reaction kettle.

4. The method according to claim 1, characterized in that the method further comprises stirring the substance in the reaction kettle with a stirring device, the stirring device comprising:

a transmission rod provided in the body of the reaction kettle;

a stirring blade mounted on the transmission rod; and a driving device provided outside of the kettle body for driving the transmission rod to rotate.

5. The method according to claim 1, characterized in that the reaction kettle is placed in an ultrasonic unit for stirring.

6. The method according to claim 1, characterized in that the pressure detecting unit includes a pressure sensor connected to the reaction kettle, and that the composite material preparation system further comprises a relief valve connected to the reaction kettle for pressure relief.

7. The composite material preparation system according to claim 1, characterized in that:

the induction coil is formed by a square copper tube, has a circular shape, is wound with an insulating layer on the outer layer, and has a turn number of 2 to 10, a length of 0.5 to 2 m, and an inner diameter of 1 to 200 mm; and the materials of the reaction kettle include high molecular polymers.

8. The composite material preparation system according to claim 1, characterized in that the reaction kettle is sealed by a sealing mechanism including a flange plate provided at the open end of the body of the reaction kettle, a flange cover provided on the kettle cover of the reaction kettle, and a fastening means for tightly connecting the flange plate and the flange cover.

9. The method according to claim 1, characterized in that the induction heating device outputs an induction frequency of 10 to 500 kHz and an induction current of 0 to 1200 A.

10. The method according to claim 4, wherein the stirring blade comprises one or more of an axial flow stirring blade, a radial flow stirring blade, or a mixed flow stirring blade.

11. The method according to claim 10, wherein the gap between the stirring blade and the inner wall of the kettle body is 0.5 to 1 cm.

* * * * *